US008844258B2

United States Patent
Ekanayake et al.

(10) Patent No.: US 8,844,258 B2
(45) Date of Patent: Sep. 30, 2014

(54) SYSTEMS AND METHODS FOR DE-ICING A GAS TURBINE ENGINE INLET SCREEN AND DEHUMIDIFYING INLET AIR FILTERS

(71) Applicant: General Electric Company, Schenectady, NY (US)

(72) Inventors: Sanji Ekanayake, Mableton, GA (US); Alston Ilford Scipio, Mableton, GA (US); Dale J. Davis, Greenville, SC (US); Ryan Margate Pastrana, Kansas City, MO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/011,318

(22) Filed: Aug. 27, 2013

(65) Prior Publication Data

US 2013/0340439 A1    Dec. 26, 2013

Related U.S. Application Data

(63) Continuation-in-part of application No. 13/303,852, filed on Nov. 23, 2011.

(51) Int. Cl.
| | |
|---|---|
| *F02G 3/00* | (2006.01) |
| *F02C 7/055* | (2006.01) |
| *F02C 7/047* | (2006.01) |
| *F02C 6/08* | (2006.01) |
| *F02C 6/18* | (2006.01) |

(52) U.S. Cl.
CPC ............... *F02C 7/047* (2013.01); *F02C 7/055* (2013.01); *F02C 6/08* (2013.01); *F02C 6/18* (2013.01)
USPC ...................................................... 60/39.093

(58) Field of Classification Search
CPC .................................. F02C 7/047; F02C 3/34
USPC ................... 60/39.5, 39.52, 39.093
See application file for complete search history.

(56) References Cited

U.S. PATENT DOCUMENTS 2,764,390 A     9/1956 Harris, Jr.
3,705,491 A  * 12/1972 Foster-Pegg ............... 60/39.55
(Continued)

FOREIGN PATENT DOCUMENTS

GB      2259287 A     3/1993

OTHER PUBLICATIONS

ATCO Emissions Management, © 2012 ATCO Ltd, 2 pages, www.atcosl.com/en-ca/Products-and-Services/Products-and-Services/gas-turbine-inlet-anti-icing.htm.

(Continued)

*Primary Examiner* — Phutthiwat Wongwian
(74) *Attorney, Agent, or Firm* — Ernest G. Cusick; Frank A. Landgraff

(57) ABSTRACT

A system for de-icing a gas turbine engine is provided. A manifold is coupled to an inlet screen. A first conduit is coupled to a stage of the compressor and a first input of a mixing component. A second conduit is coupled to the exhaust and a second input of the mixing component. The second conduit being adapted to extract exhaust gases without increasing the pressure at the exhaust. A third conduit is coupled to the output of the mixing component and the manifold. A method for de-icing a gas turbine engine inlet screen includes determining a current temperature at the inlet screen, and determining a desired temperature at the inlet screen. If the current temperature at the inlet screen is less than the desired temperature at the inlet screen first flow rate of an air-exhaust mixture necessary to achieve the desired inlet screen temperature is calculated. The method also includes extracting an amount of exhaust gas from a turbine exhaust subsystem without increasing a pressure at the turbine exhaust subsystem, extracting an amount of air from a compressor stage, and mixing the amount of exhaust gas with the amount of air to generate an air-exhaust mixture that is conveyed to the inlet screen.

9 Claims, 6 Drawing Sheets

(56) References Cited

U.S. PATENT DOCUMENTS

| | | | |
|---|---|---|---|
| 3,842,597 A | 10/1974 | Ehrich | |
| 3,871,844 A | 3/1975 | Calvin, Sr. | |
| 3,925,979 A | 12/1975 | Ziegler | |
| 4,328,666 A * | 5/1982 | Cummins, Jr. | 60/39.093 |
| 4,561,245 A | 12/1985 | Ball | |
| 4,620,414 A | 11/1986 | Christ | |
| 4,991,391 A | 2/1991 | Kosinski | |
| 5,182,427 A | 1/1993 | McGaffigan | |
| 5,220,785 A | 6/1993 | Miller | |
| 5,423,174 A | 6/1995 | Mouton | |
| 5,925,275 A | 7/1999 | Lawson et al. | |
| 6,666,026 B2 * | 12/2003 | Jungsch et al. | 60/772 |
| 6,779,346 B2 | 8/2004 | Nichols et al. | |
| 6,912,856 B2 | 7/2005 | Morgan et al. | |
| 7,421,835 B2 * | 9/2008 | Rabovitser et al. | 60/39.12 |
| 8,272,222 B2 * | 9/2012 | Zhang et al. | 60/785 |
| 2004/0103626 A1 | 6/2004 | Warth et al. | |
| 2006/0280600 A1 | 12/2006 | Euvino et al. | |
| 2007/0187381 A1 | 8/2007 | Vontell et al. | |
| 2009/0235634 A1 | 9/2009 | Wang et al. | |
| 2009/0241552 A1 | 10/2009 | Vega et al. | |
| 2009/0242549 A1 | 10/2009 | Hogate | |
| 2010/0003123 A1 * | 1/2010 | Smith | 415/116 |
| 2010/0050873 A1 | 3/2010 | Hiner et al. | |
| 2010/0101209 A1 * | 4/2010 | Feher et al. | 60/266 |
| 2010/0108661 A1 | 5/2010 | Vontell et al. | |
| 2011/0138770 A1 * | 6/2011 | Bryant | 60/39.092 |
| 2011/0247313 A1 * | 10/2011 | Chillar et al. | 60/39.093 |
| 2013/0125557 A1 | 5/2013 | Scipio | |
| 2013/0193127 A1 | 8/2013 | Scipio | |
| 2013/0239573 A1 * | 9/2013 | Brighenti et al. | 60/643 |

OTHER PUBLICATIONS

ATCO Gas Turbine Inlet Anti-Icing Brochure, Higgott-Kane Division, Canada, 2012, 4 pages, www.higg-kane-atco.com.

Johnson et al., "SPEEDTRONIC™ Mark V Gas Turbine Control Subsystem," GE Industrial & Power Systems of Schenectady, N.Y, © 1996.

Rokke, Petter and Johan E. Hustad, "Exhaust Gas Recirculation in Gas Turbines for Reduction of C02 Emissions; Combustion Testing with Focus on Stability and Emissions", Int. J. of Thermodynamics, 8(4), 167-173, Sep. 2005.

Sammak, "Anti-Icing in Gas Turbines" Thesis for the Degree of Master of Science, Department of Energy Sciences, Lund University, Lund Sweden, Feb. 2006, pp. 1-132, www.vok.lth.se.

* cited by examiner

SYSTEMS AND METHODS FOR DE-ICING A GAS TURBINE ENGINE INLET SCREEN AND DEHUMIDIFYING INLET AIR FILTERS

CROSS-REFERENCE TO RELATED APPLICATIONS

This application is a continuation-in-part of U.S. Ser. No. 13/303,852 filed Nov. 23, 2011.

TECHNICAL FIELD

The subject matter disclosed herein generally relates to gas turbine engines and more particularly to methods and systems to prevent icing of gas turbine engine inlet screens.

BACKGROUND

Gas turbine engines typically include a compressor for compressing incoming air, a combustor for mixing fuel with the compressed air and for igniting a fuel/air mixture to form a high temperature gas stream, and a turbine section driven by the high temperature gas stream.

Gas turbine engines are utilized globally for electric power generation or as mechanical drives for operating pumps and compressors, under a variety of climatic conditions. Operation during cold ambient temperature and high humidity conditions often causes ice to build up on the turbine inlet filter house components. Frequently this ice build-up on air filtration elements (bird screens, moisture separators, coalescer filters, and filtration modules) is severe enough to restrict air flow and to increase the inlet air pressure drop across the filter house thus leading to combustion turbine performance loss or even shut down. Precipitating icing forms when water ingested as liquid or solid at a temperature near or below freezing (wet snow, freezing rain, etc.) adheres to most exposed surfaces, causing ice buildup. Also, ice formation occurs when saturated cooled air comes in contact with colder filter house surfaces.

One common approach to manage inlet ice build-up is to remove the moisture separators and coalescer filters installed in a weather hood, and heat the ambient air upstream of the air filter modules using hot air or, heating coils supplied either with steam or hot water/glycol mixture.

In accordance with a typical prior art anti-icing system, exhaust gas is recirculated by positioning a bypass valve in the exhaust stack channel. This permits enough hot exhaust gases to be constantly recirculated to the inlet to maintain turbine inlet air temperature at a minimum of +40° F. This approach has the disadvantage of increasing the pressure at the turbine exhaust, thereby negatively impacting the performance of the gas turbine engine.

Another type of anti-icing system utilizes heating coils positioned ahead of the inlet filters to provide heating during ambient conditions that promote the formation of ice on the air filters, interior filter house walls, as well as on downstream gas turbine components such as inlet guide vanes and compressor first stage blades. For coil-based systems, heating is supplied to the coils in the form of a hot water water/glycol mixture or low pressure (LP) steam. This approach increases the capital-costs and may negatively impact production efficiency through the operating year due to the additional air flow restriction (pressure drop) imposed by, for example, the heating coils.

Another approach is to provide a plurality of heating panels (bundles) located on or adjacent to the turbine's inlet air filter house. Each heating panel is provided with one or more electrically-resistive heating elements. A controller for selectively activating the resistive heating elements on each of the plurality of heating panels is also provided.

BRIEF DESCRIPTION OF THE INVENTION

The disclosure provides a solution to the problem of preventing ice build-up on the gas turbine engine inlet screens, without significant performance loss.

In accordance with one exemplary non-limiting embodiment, the invention relates to a method for heating an inlet screen in a gas turbine. The method includes determining a current inlet screen temperature and determining a desired inlet screen temperature. If the current inlet screen temperature is less than the desired inlet screen temperature, the method includes calculating a first flow rate of an air-exhaust mixture necessary to achieve the desired inlet screen temperature. The method also includes extracting an amount of exhaust gas from a turbine exhaust subsystem without increasing a pressure at the turbine exhaust subsystem, extracting an amount of air from a compressor stage, and mixing the amount of exhaust gas with the amount of air to generate an air-exhaust mixture. The method also includes conveying the air-exhaust mixture to the inlet screen, the air-exhaust mixture being conveyed at a flow rate equivalent to the first flow rate.

In another embodiment, a system includes a compressor, a turbine having an exhaust, and an inlet screen. A manifold is coupled to the inlet screen. A mixing component having a first input, a second input and an output is provided. A first conduit is coupled to a stage of the compressor and the first input of the mixing component. A second conduit is coupled to the exhaust and the second input of the mixing component, with the second conduit being adapted to extract exhaust gases without increasing the pressure at the exhaust. A third conduit is coupled to the output of the mixing component and the manifold.

In another embodiment, a system including a compressor, a combustion system, a turbine, and a turbine exhaust subsystem is provided. The system includes a compressor inlet coupled to the compressor and an inlet screen coupled to the compressor inlet. A manifold is coupled to the inlet screen. A compressor extraction subsystem adapted to extract air from the compressor is coupled to a stage of the compressor. An exhaust extraction subsystem, adapted to extract exhaust gases without increasing the pressure at the exhaust subsystem, is coupled to the turbine exhaust subsystem. A mixing component is coupled to the compressor extraction subsystem and the exhaust extraction subsystem. The mixing component is adapted to mix the air and exhaust gases to generate an air-exhaust mixture. The system includes a first conduit coupled to the mixing component and the manifold that conveys the air-exhaust mixture to the manifold.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

Figure 1:
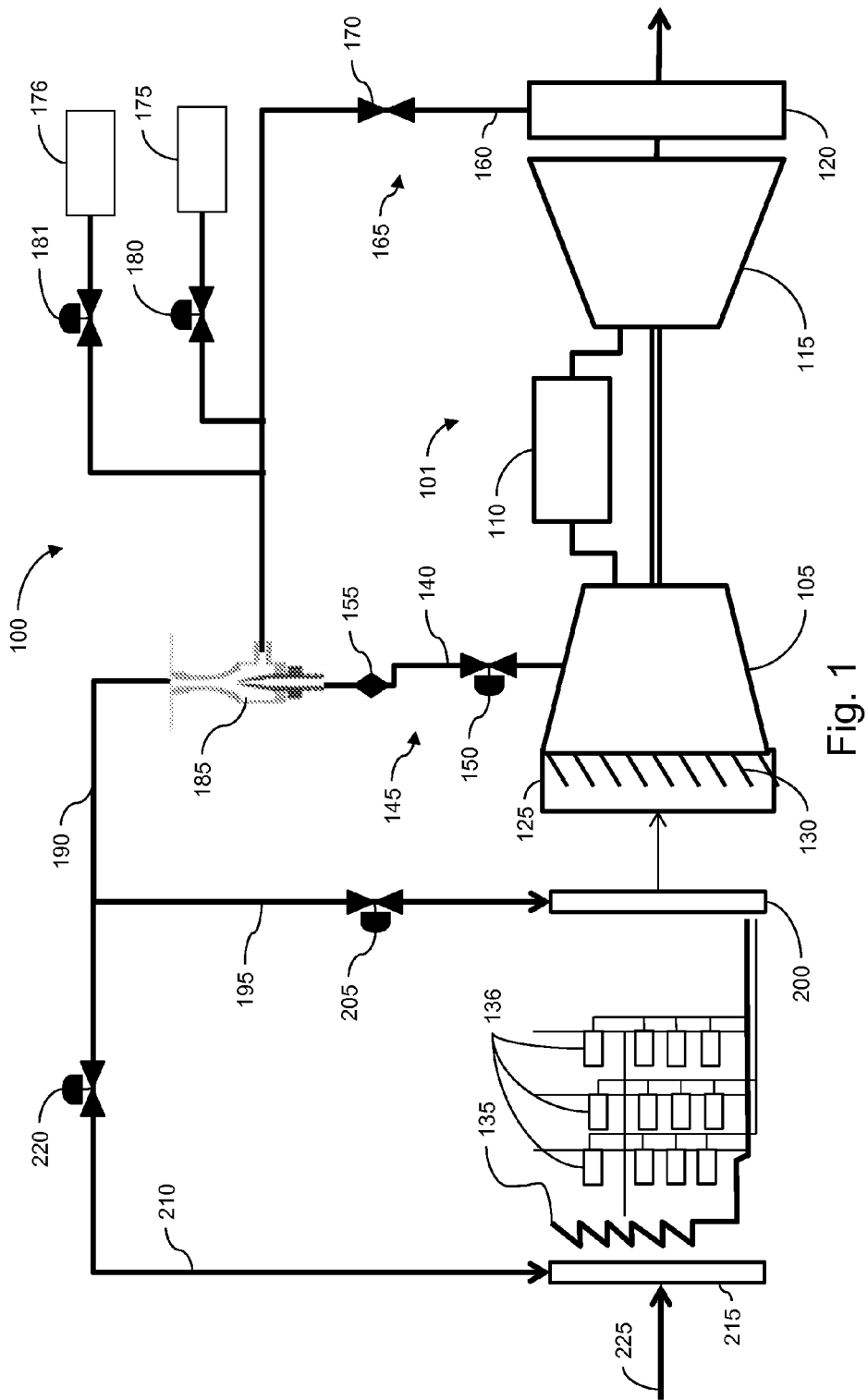
FIG. 1 is a schematic of an embodiment of a system for de-icing a gas turbine engine inlet screen.

Illustrated in FIG. 1 is an embodiment of a gas turbine system 100 with an inlet screen de-icing capability. The gas turbine system 100 may include one or more gas turbine engine(s) 101. Each gas turbine engine 101 includes a compressor 105 that compresses an incoming flow of air. The compressor 105 delivers the compressed flow of air to a combustion subsystem 110 where the compressed flow of air mixes with a compressed flow of fuel and the mixture is ignited to create a flow of combustion gases. The flow of combustion gases is in turn delivered to a turbine 115 and drives the turbine 115 to produce mechanical work. The mechanical work produced in the turbine 115 drives the compressor 105 and an external load such as, for example, an electrical generator. The flow of combustion gases may be exhausted via an exhaust subsystem 120 to a stack or otherwise disposed.

The gas turbine engine 101 may include a compressor inlet subsystem 125 with an articulated inlet guide vane assembly 130 that extends substantially circumferentially within the gas turbine engine 101.

Gas turbine engine 101 may include inlet screen 135 or filter house that include filter assemblies having a plurality of inlet air filters 136 that remove moisture and particulate matter, such as dust and/or debris, from air channeled to the gas turbine engine 101.

The gas turbine system 100 also may include a compressor bypass conduit 140 (first conduit) that is used to extract an amount of compressed air from a stage of the compressor 105. Associated with the compressor bypass conduit 140 is a first conduit control subsystem 145 that may include a first conduit control valve 150 and a first conduit flow sensor 155. The gas turbine system 100 also includes an exhaust bypass conduit 160 (second conduit) and a second conduit control subsystem 165. The exhaust bypass conduit 160 extracts an amount of exhaust gases from the exhaust subsystem 120 without increasing the pressure at the exhaust subsystem 120 (for example through suction). The second conduit control subsystem 165 may include a second conduit block valve 170. Exhaust gases flowing through the exhaust bypass conduit 160 may be mixed with filtered air from the filtered air source 175. The amount of filtered air is controlled with filtered air control valve 180. An alternative unfiltered air source 176 is unfiltered and is controlled with control valve 181 and may be mixed with the flow in exhaust bypass conduit 160.

Air from the compressor bypass conduit 140 and exhaust gases from the exhaust bypass conduit 160—which may or may not be mixed with filtered or unfiltered air—are mixed in mixing component 185, such as, for example, an eductor. As known by those skilled in the art, eductors are a kind of jet-type pump that do not require any moving parts to be able to pump out a liquid or gas from a certain area. These pumps make use of their structure to transfer energy from one fluid to another via the Venturi effect. In the eductor, the driving fluid (pressurized air from the compressor 105) passes through the nozzle of the eductor, converting the pressure energy into a jet. The result of this is that the fluid at the front of the jet is displaced, producing an area of low pressure at the exit of the nozzle. Exhaust gases are sucked in via the branch inlet of the eductor thereby creating a suction flow. The compressed air and the sucked in exhaust gases are mixed as they move through the eductor's diffuser. The velocity energy of this air-exhaust gas mixture converts to pressure energy so that the air-exhaust gas mixture is discharged from the eductor with a back-pressure that is stronger than the suction pressure.

The mixture of air and exhaust gases is conveyed to a third conduit 190. A portion of the mixture of air and exhaust gases may be conveyed through inlet bleed heat conduit (IBH conduit 195) to an inlet bleed heat manifold (IBH manifold 200). The amount of the mixture of air and exhaust gases conveyed to the IBH manifold 200 is controlled by means of IBH bypass control valve 205. A portion of the air-exhaust gas mixture also may be conveyed through inlet screen conduit 210 to anti-icing manifold 215. The amount of the air-exhaust gas mixture conveyed to the anti-icing manifold 215 is controlled by means of an inlet screen control valve 220. The mixture of air and exhaust gases is further combined with ambient air from ambient air intake 225. In the case where the entire flow in third conduit 190 is conveyed to the anti-icing manifold 215, the alternative unfiltered air source 176 may be utilized in order to minimize duty on the inlet air filters 136.

In operation, compressed air from a stage of the compressor 105 (at a temperature Tcsn) is conveyed to the mixing component 185. Exhaust gases (at a temperature Tex) are extracted from the exhaust subsystem 120 as a result of the lower pressure created at the mixing component 185 (e.g. an eductor) without increasing the pressure at the exhaust subsystem 120. The amount of compressed air and exhaust gases that are conveyed to the mixing component 185 depend upon the desired temperature at the inlet screen 135 (desired Tis), the actual temperature at the inlet screen 135 (Tis actual), the desired temperature at the inlet air filters 136 (desired Tfilter), the desired temperature at the compressor inlet (desired Tinlet), the actual temperature at the compressor inlet subsystem 125 (actual Tinlet), and the ambient temperature (Tamb). The relative amounts of air or gas are calculated using mass flow calculations and are controlled by means of the first conduit control valve 150, second conduit block valve 170, IBH bypass control valve 205, and inlet screen control valve 220.

Figure 2:
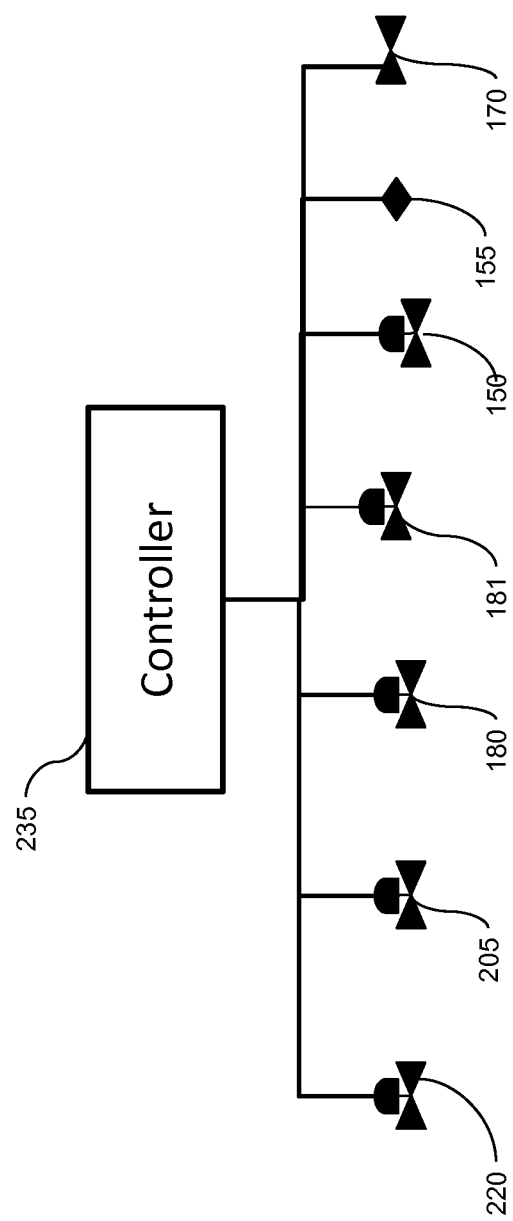
FIG. 2 is a schematic of an embodiment of a control system used in a system for de-icing a gas turbine engine inlet screen.

As illustrated in FIG. 2, the positions of the first conduit control valve 150, second conduit block valve 170, IBH bypass control valve 205, filtered air control valve 180, control valve 181, and inlet screen control valve 220 are controlled by controller 235. The controller 235 may also receive inputs from first conduit flow sensor 155, among others. The controller 235 may be an independent controller or integrated with a gas turbine control system.

An example of a gas turbine control system is General Electric Company's Speedtronic™ Mark VI™ Control System, which is designed to fulfill all gas turbine control requirements, including speed and load control functions, which act to control fuel flow under part-load conditions, and temperature control which limits fuel flow to a maximum consistent with achieving rated firing temperatures, and controls air-flow via the inlet guide vanes. The Mark VI™ control system also handles sequencing of the auxiliaries to allow fully automated start-up, shut-down and cool-down. The basic system incorporates gas turbine system protection against adverse operating conditions and annunciation of abnormal conditions. Thus, the control system performs many functions including fuel, air and emissions control, sequencing of fuel and auxiliary for start-up, shut-down and cool-down, synchronization and voltage matching of generator and system, monitoring of all turbine, control and auxiliary functions, and protection against unsafe and adverse operating conditions. All of these functions are performed in an integrated manner to perform the desired preprogrammed and/or operator input control philosophy.

Figure 3:
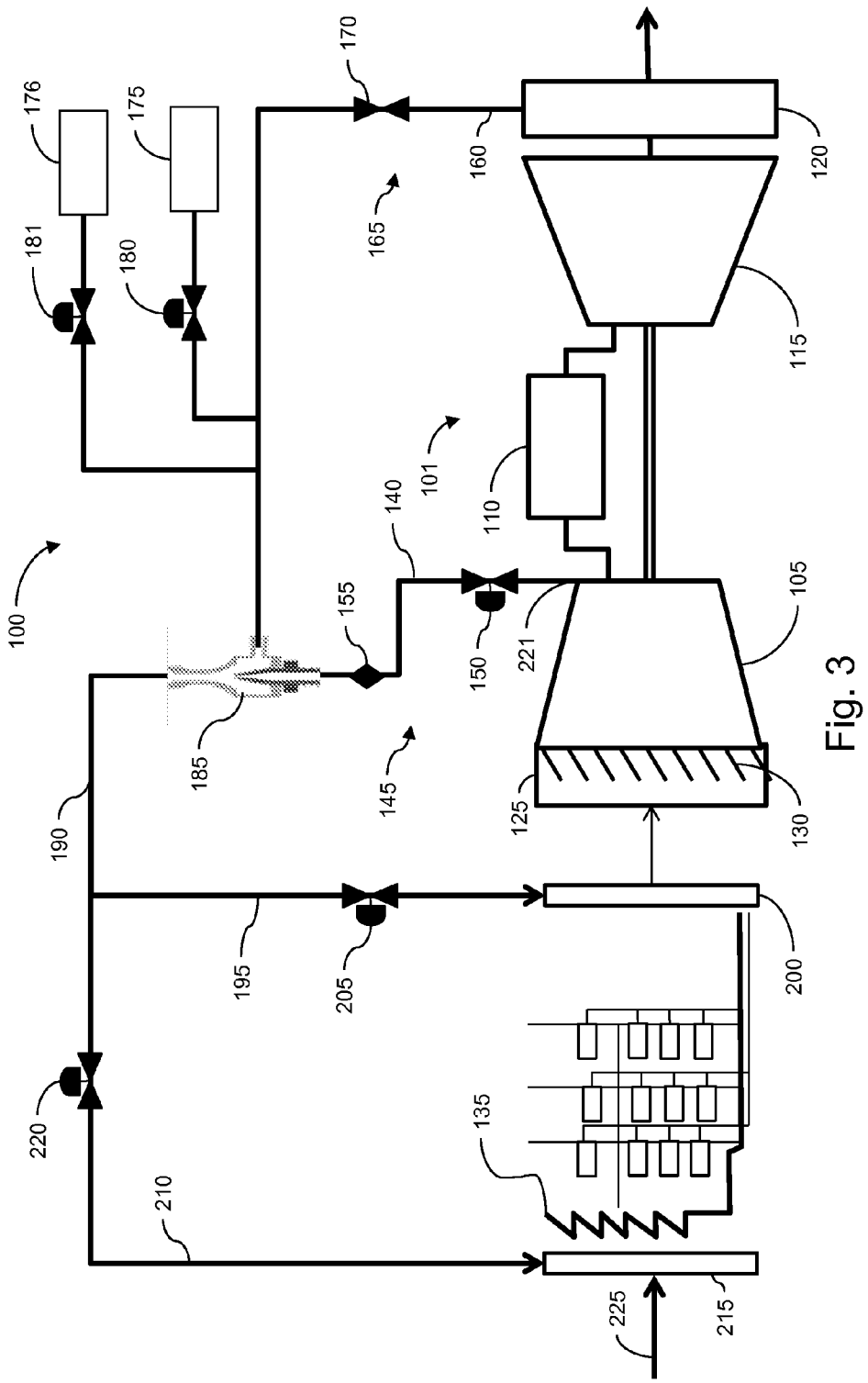
FIG. 3 is an alternate embodiment of a system for de-icing a gas turbine engine inlet screen.

In another embodiment, shown in FIG. 3, the compressor bypass conduit 140 may be coupled to the compressor outlet 221. Compressed air from the compressor outlet 221 is mixed with exhaust gases that are extracted from the exhaust subsystem 120 by means of suction. This may be accomplished using a mixing component 185 such as an eductor.

Figure 4:
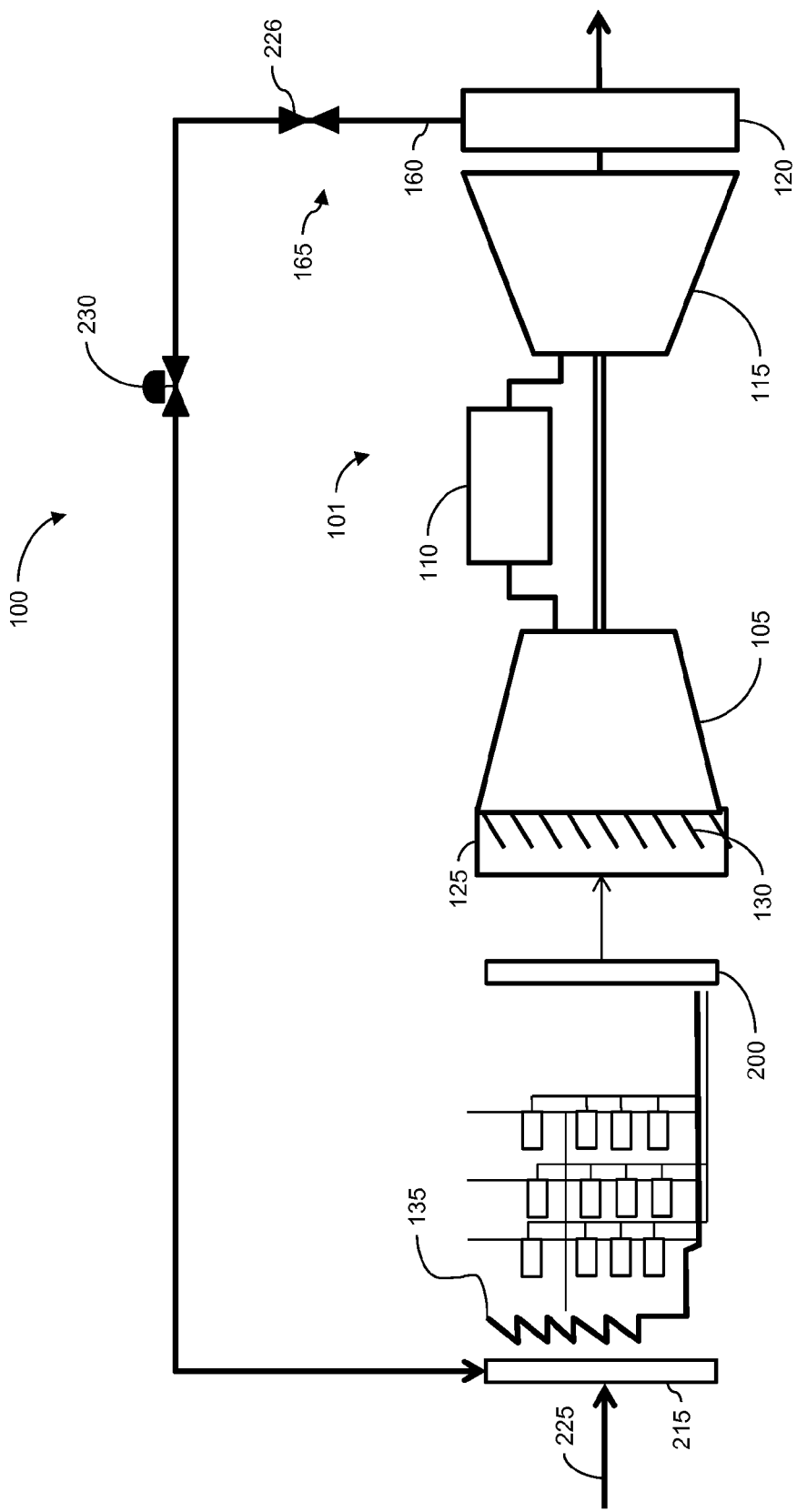
FIG. 4 is an alternate embodiment of a system for de-icing a gas turbine engine inlet screen.

In another embodiment, illustrated in FIG. 4, the second conduit (exhaust bypass conduit 160) may be a large diameter duct having a block valve 226 and a control valve 230. Exhaust gases in a combined-cycle configuration are typically at a pressure of about 12 inches H2O. This positive pressure relative to ambient pressure is the motive force to transport the exhaust flow fraction to the anti-icing manifold 215. Given the relatively low supply pressure of the exhaust gas, it is anticipated that this bypass duct may have a cross-sectional area , for example, of about 30% of the cross-sectional area of the exhaust bypass conduit 160 leading from the gas turbine exhaust to the heat recovery steam generator inlet in order to accommodate the required bypass flow.

Figure 5:
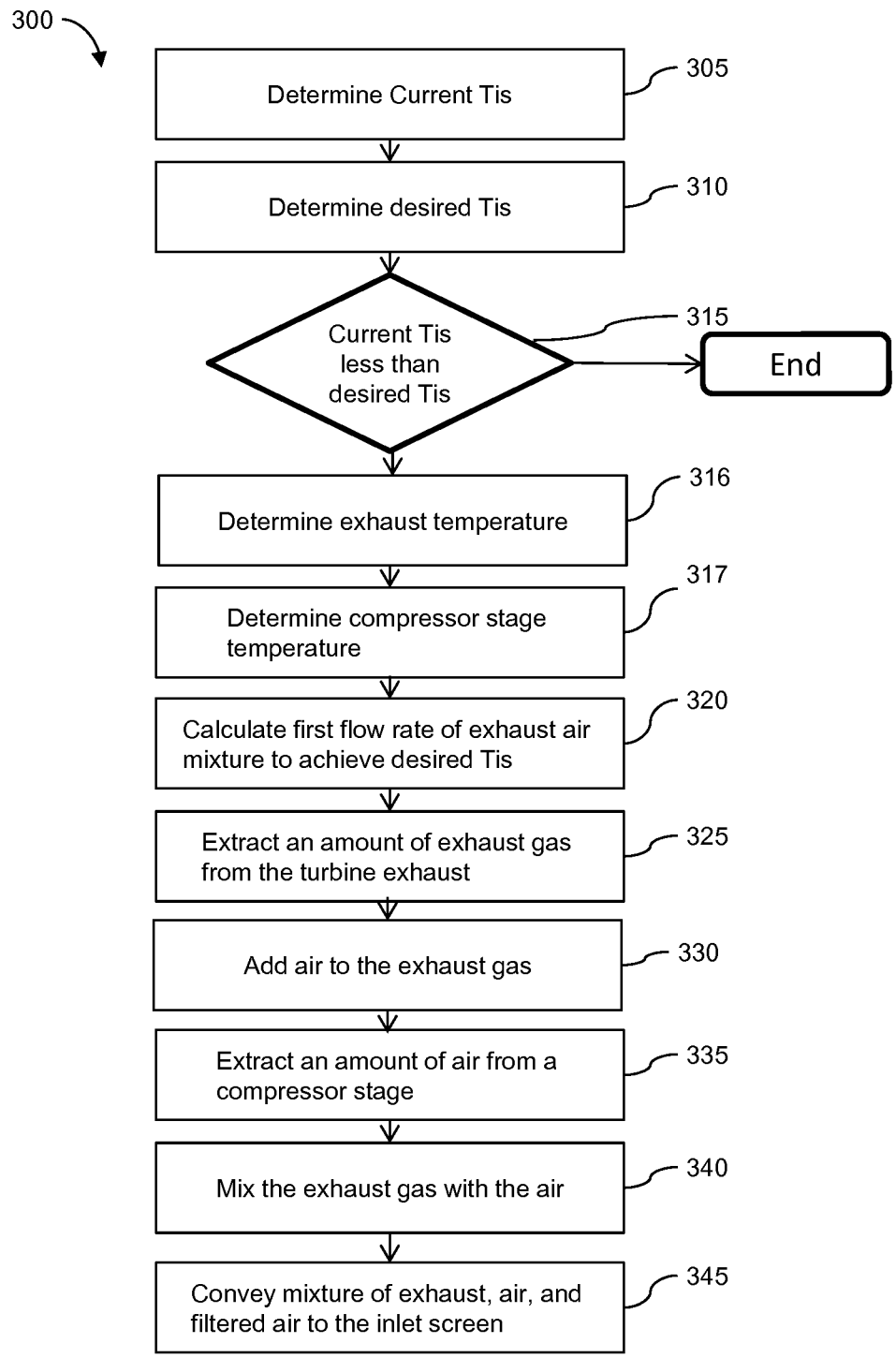
FIG. 5 is a flow chart illustrating a method for de-icing a gas turbine inlet screen.

Illustrated in FIG. 5 is a method 300 for de-icing an inlet screen 135 of a gas turbine engine 101.

In step 305, the method 300 determines a current temperature at the inlet screen 135.

In step 310, the method 300 determines a desired temperature at the inlet screen 135. The desired temperature at the inlet screen 135 may be a temperature sufficient to de-ice the inlet screen 135, or to dehumidify the inlet air filters 136 to prevent the formation of ice or water droplets.

In step 315, the method 300 determines if the current temperature at the inlet screen 135 is less than the desired temperature at the inlet screen 135. If the current temperature at the inlet screen 135 is less than the desired temperature at the inlet screen 135, then the following additional steps are included in the method.

In step 316, the method 300 determines the exhaust temperature.

In step 317, the method 300 determines the compressor stage temperature.

In step 320, the method 300 calculates a first flow rate of an exhaust-air mixture necessary to achieve the desired temperature at the inlet screen 135.

In step 325, the method 300 extracts an amount of exhaust gas from a turbine exhaust by means of suction.

In step 330, the method 300 mixes the amount of exhaust gas with the amount of air to generate an air-exhaust mixture. The air-exhaust mixture may also be mixed with filtered air.

In step 335, the method 300 extracts an amount of air from a compressor stage.

In step 340, the method 300 mixes the exhaust or air-exhaust mixture with air from a compressor stage. Step 340 may be accomplished with an eductor.

In step 345, the method 300 conveys the air-exhaust mixture to the inlet screen at a flow rate equivalent to the first flow rate. This may be accomplished by adjusting an inlet screen control valve 220.

Figure 6:
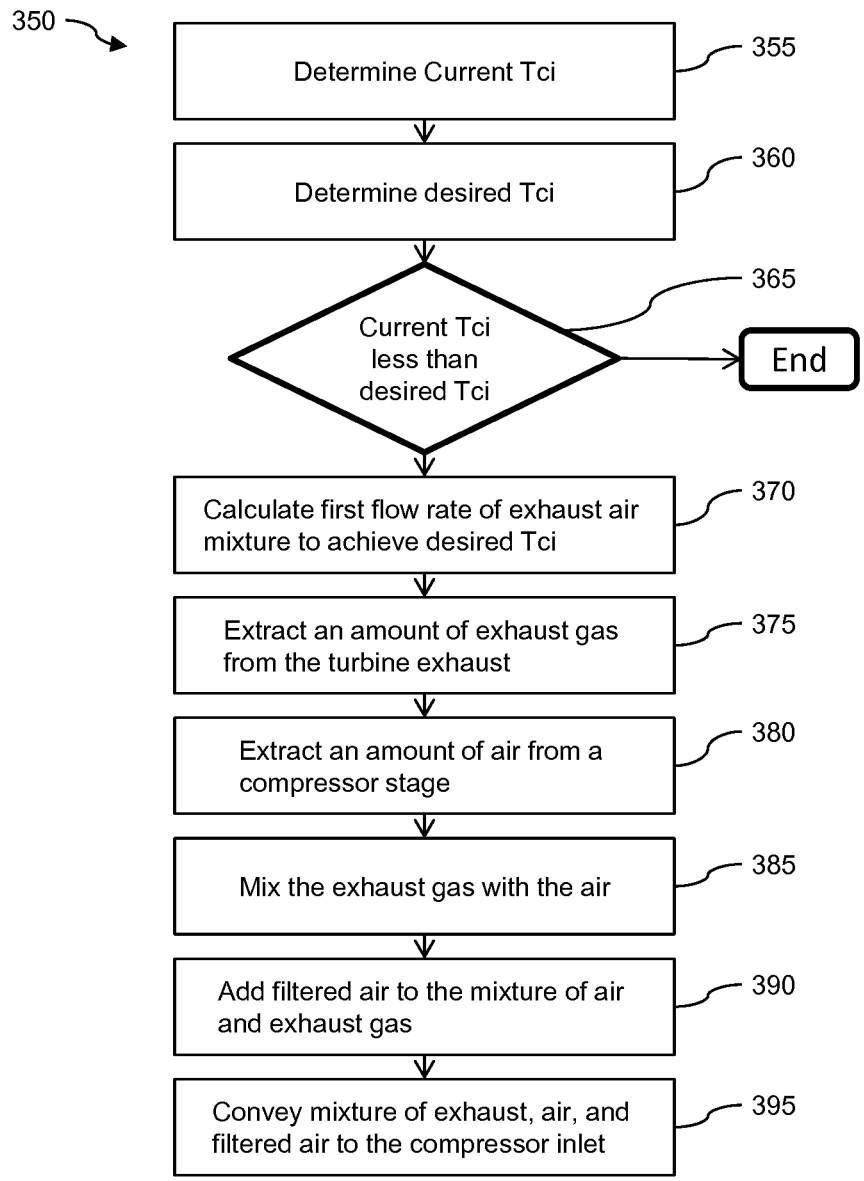
FIG. 6 is a flow chart illustrating additional steps in a method for de-icing a gas turbine inlet screen.

FIG. 6 illustrates additional steps 350 that may be performed by the method 300.

In step 355, the method 300 determines a current temperature at the compressor inlet subsystem 125.

In step 360, the method 300 determines a desired temperature at the compressor inlet subsystem 125.

In step 365 the method 300 determines if the current temperature at the compressor inlet subsystem 125 is less than the desired temperature at the compressor inlet subsystem 125. If the current temperature at the compressor inlet subsystem 125 is less than the desired temperature at the compressor inlet subsystem 125, then the method 300 performs the following additional steps.

In step 370, the method 300 calculates a second flow rate of an air-exhaust mixture necessary to achieve the desired temperature at the compressor inlet subsystem 125.

In step 375, the method 300 extracts an amount of exhaust gas from a turbine exhaust without increasing the pressure at the turbine exhaust.

In step 380, the method 300 extracts an amount of air from a compressor stage;

In step 385, the method 300 mixes the amount of exhaust gas with the amount of air to generate the air-exhaust mixture; and In step 390, the method 300 conveys the air-exhaust mixture to the compressor inlet at a flow rate equivalent to the second flow rate.

The method 300 enables the control of the temperature at the anti-icing manifold 215 and the IBH manifold 200 to avoid icing of the inlet screen and optimize performance of the gas turbine system 100. This is accomplished without increasing the pressure at the exhaust thereby avoiding a negative performance impact.

Where the definition of terms departs from the commonly used meaning of the term, applicant intends to utilize the definitions provided below, unless specifically indicated.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A system comprising:
a compressor;
a turbine having an exhaust;
an inlet screen;
an anti-icing manifold coupled to the inlet screen;
an eductor functioning as a mixing component having a first input, a second input and an output;
a first conduit coupled to a stage of the compressor and the first input of the eductor;
a second conduit coupled to the exhaust and the second input of the eductor, wherein the second conduit is adapted to extract exhaust gases through suction; and
a third conduit coupled to the output of the eductor and the anti-icing manifold;

further comprising a first control valve disposed on the first conduit; and a first block valve disposed on the second conduit, and further comprising a second control valve disposed on the third conduit, wherein a single controller provides signals controlling positions of the first control valve, the first block valve, and the second control valve.

2. The system of claim 1, further comprising an IBH system coupled to the compressor and an IBH manifold coupled to the third conduit and the IBH system.

3. The system of claim 1, further comprising a combustor coupled to the compressor and the turbine.

4. The system of claim 3, further comprising a heat recovery steam generator coupled to the turbine.

5. A system comprising:
a compressor;
a combustion system;
a turbine;
a turbine exhaust subsystem;
a compressor inlet coupled to the compressor;
an inlet screen coupled to the compressor inlet;
an anti-icing manifold coupled to the inlet screen;
a compressor extraction subsystem coupled to a stage of the compressor, the compressor extraction subsystem adapted to extract air from the compressor;
an exhaust extraction subsystem coupled to the turbine exhaust subsystem, the exhaust extraction subsystem comprising a second conduit adapted to extract exhaust gases using suction;
an eductor-functioning as a mixing component coupled to the compressor extraction subsystem and the exhaust extraction subsystem, the eductor-comprising a third conduit and mixing the air and exhaust gases to generate an air-exhaust mixture; and
a first conduit coupled to the eductor and the anti-icing manifold that conveys the air-exhaust mixture to the manifold,
further comprising a first control valve disposed on the first conduit; and a first block valve disposed on the second conduit, and further comprising a second control valve disposed on the third conduit, wherein a single controller provides signals controlling positions of the first control valve, the first block valve, and the second control valve.

6. The system of claim 5, further comprising:
an inlet bleed heat manifold coupled to the compressor inlet; and
a second conduit coupled to the eductor and the inlet bleed heat manifold.

7. The system of claim 5, further comprising:
a first control subsystem disposed on the first conduit;
a second control subsystem coupled to the exhaust extraction subsystem; and
a third control subsystem coupled to the compressor extraction subsystem.

8. The system of claim 5, further comprising a mechanical load coupled to the turbine.

9. The system of claim 5, further comprising a steam turbine coupled to the turbine exhaust subsystem.

* * * * *